United States Patent
Alatorre et al.

(10) Patent No.: US 9,807,014 B2
(45) Date of Patent: Oct. 31, 2017

(54) REACTIVE THROTTLING OF HETEROGENEOUS MIGRATION SESSIONS IN A VIRTUALIZED CLOUD ENVIRONMENT

(71) Applicant: International Business Machines Corporation, Armonk, NY (US)

(72) Inventors: Gabriel Alatorre, Campbell, CA (US);
Eric K. Butler, San Jose, CA (US);
Mark V. Chitti, Richmond, KY (US);
James E. Olson, Oxford, CT (US);
Aameek Singh, University Place, WA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 14/039,898

(22) Filed: Sep. 27, 2013

(65) Prior Publication Data

US 2015/0095485 A1 Apr. 2, 2015

(51) Int. Cl.
*G06F 15/173* (2006.01)
*H04L 12/803* (2013.01)

(52) U.S. Cl.
CPC ................. *H04L 47/125* (2013.01)

(58) Field of Classification Search
None
See application file for complete search history.

(56) References Cited

U.S. PATENT DOCUMENTS

| 7,680,035 | B2 | 3/2010 | Krishnan |
| 8,365,009 | B2 | 1/2013 | Dournov et al. |
| 2004/0003087 | A1 | 1/2004 | Chambliss et al. |
| 2004/0205206 | A1 | 10/2004 | Naik et al. |
| 2006/0233108 | A1* | 10/2006 | Krishnan ............. H04J 3/1682 370/235 |
| 2010/0268816 | A1* | 10/2010 | Tarui ...................... H04L 12/00 709/224 |

(Continued)

OTHER PUBLICATIONS

Baker et al., "Cut Me SomeSlack": Latency-Aware Live Migration for Databases, Mar. 2012, pp. 432-443, Proceedings of the 15th International Conference on Extending Database Technology, ACM.

(Continued)

*Primary Examiner* — Lance Leonard Barry
*Assistant Examiner* — Mohammad Yousuf A Mian
(74) *Attorney, Agent, or Firm* — Lisa Ulrich; Hoffman Warnick LLC

(57) ABSTRACT

An approach for reactive throttling of heterogeneous migration sessions running concurrently in a virtualized cloud environment is disclosed. The heterogeneous migration sessions are characterized by several attributes such as the type of function performed by the migration session and the value that is attained by performing the migration session. An input/output (I/O) path to any resource in the virtualized cloud environment computing that is experiencing excessive resource congestion is identified. Bottlenecks along the I/O path are then determined. Virtual-to-physical resource mapping information of resources in the virtualized cloud computing environment are used to obtain a list of the heterogeneous migration sessions contributing to the bottlenecks along the identified I/O path.

20 Claims, 9 Drawing Sheets

(56) References Cited

U.S. PATENT DOCUMENTS

| | | | |
|---|---|---|---|
| 2011/0225303 A1* | 9/2011 | Engebretson | H04L 47/193 709/227 |
| 2012/0101973 A1* | 4/2012 | Ito | G06F 17/30221 706/50 |
| 2012/0254400 A1 | 10/2012 | Iyengar et al. | |
| 2012/0311592 A1* | 12/2012 | Kim | G06F 9/4887 718/102 |
| 2013/0003538 A1 | 1/2013 | Greenberg et al. | |
| 2013/0007254 A1* | 1/2013 | Fries | H04L 43/0876 709/224 |
| 2013/0086272 A1* | 4/2013 | Chen | G06F 9/4856 709/226 |
| 2013/0297899 A1* | 11/2013 | Kawaguchi | G06F 3/0613 711/162 |

OTHER PUBLICATIONS

Liu et al., "Xen Live Migration with Slowdown Scheduling Algorithm," 2010, pp. 215-221, International Conference on Parallel and Distributed Computing, Applications and Technologies (PDCAT).

Lu et al., "Aqueduct: Online Data Migration with Performance Guarantees," Jan. 2002, pp. 219-230, Conference on File and Storage Technologies (FAST '02).

Sonnek et al., "Starling: Minimizing Communication Overhead in Virtualized Computing Platforms Using Decentralized Affinity-Aware Migration," Dec. 2009, pp. 228-237, 39th International Conference on Parallel Processing (ICPP).

Stage et al., "Network-Aware Migration Control and Scheduling of Differentiated Virtual Machine Workloads," May 2009, pp. 9-14, Proceedings of the ICSE Workshop on Software Engineering Challenges of Cloud Computing.

* cited by examiner

REACTIVE THROTTLING OF HETEROGENEOUS MIGRATION SESSIONS IN A VIRTUALIZED CLOUD ENVIRONMENT

BACKGROUND

1. Field of the Invention

This invention relates generally to cloud computing, and more specifically, to throttling heterogeneous migration sessions in a virtualized cloud computing environment.

2. Description of the Related Art

A cloud computing environment is generally a large number of server computers (nodes) hosting data and applications that are connected through a real-time communication network. Virtualization technologies enable the sharing of computational and storage resources in the cloud computing environment by creating virtual versions of devices or resources that are divided into one or more execution environments. For example, in a virtualized cloud computing data center, physical resources such as processors, memories, network bandwidth and storage are abstracted in virtual pools for efficient resource utilization and improved manageability.

In a typical virtualized cloud computing data center, input/output (I/O) traffic is usually categorized as cloud user generated traffic or cloud management related traffic. Cloud user generated traffic is generally any work that has to be carried in the cloud computing center that is beyond a cloud administrator's control. It is usually transparent to end users and is less controllable by cloud administrators. Inter virtual machine (VM) communications, application I/O requests to storage devices, are some examples of cloud user generated traffic. Cloud management related traffic is generally any work initiated by a cloud administrator via cloud management/orchestration software that facilitates load balancing and improved resource utilization. Virtual disk (VD) and VM migrations and backup/restore sessions are examples of cloud management related traffic. Typically, cloud user generated traffic and cloud management related traffic coexist in the virtualized cloud computing data center and share the same resource pools such as network bandwidth, device CPU cycles, I/O bandwidth, etc.

Even though cloud user generated traffic and cloud management related traffic can coexist, scenarios in which multiple sessions of cloud management are initiated can lead to cloud management related traffic that yields undesirable congestion and application latency in the virtualized cloud computing data center. For example, consider where a cloud administrator initiates a mixture of VM migration sessions, fileset migration sessions and storage volume migration sessions; each of which is heterogeneous in their types of functions performed. During these migration sessions, an application may experience excessive I/O latency. The cloud management related traffic generated from these currently running migration sessions can contribute to the excessive latency by causing congestion. This deteriorates a cloud user's experience and will likely violate a service level agreement (SLA) that is associated with the virtualized cloud computing data center.

In the above scenario, a cloud administrator would typically attempt to throttle or reduce migration transfer rates of the running migration sessions to alleviate network congestion and/or resource overutilization and reduce the application I/O latency to an acceptable level. There are a number of approaches in which a cloud administrator can throttle migration sessions. For example, for storage volume migrations, a mirrored volume can be created first and the original volume can be deleted after the two volumes are synchronized to complete the migration. Since synchronization can last from a few seconds to a few hours, throttling involves an instruction from the cloud administrator to reduce the synchronization rate, which in turn, reduces the traffic load in the data center. Similarly, for VM migrations, the migration speed can be regulated by enabling certain features on a corresponding datastore.

These currently available approaches to throttling migration sessions are limited in that they can typically only focus on one specific type of migration at a time. For example, these approaches to throttling migration session can work on only homogeneous migration sessions and not heterogeneous migration sessions (e.g., storage volume, a VM or file) having varying types of functions that run concurrently and share the same set of devices/resources.

SUMMARY

Various embodiments of the present invention are able to throttle heterogeneous migration sessions of differing types of functions (e.g., VM, file, volume) to reduce traffic congestion in a virtualized cloud computing data center by leveraging virtual-to-physical mapping information of resources in the data center. In particular, embodiments of the present invention use virtual-to-physical resource mapping information for heterogeneous migration sessions running concurrently and sharing a device or resource that is identified as a bottleneck in a virtualized cloud computing data center, to determine a contribution portion that each session contributes to the bottleneck. The contribution portions along with various migration session attributes can be used to efficiently throttle the sessions to reduce traffic congestion in a virtualized cloud computing environment such as a virtualized cloud computing data center.

In one embodiment, there is a method performed on a computer system. In this embodiment, the method comprises using the computer system to perform the following: initiating a plurality of heterogeneous migration sessions in a virtualized cloud computing environment, the plurality of heterogeneous migration sessions running concurrently in the virtualized cloud computing environment and sharing a same set of resources, wherein each heterogeneous migration session is characterized by a type of function performed by the migration session and a value that is attained by performing the migration session; monitoring the virtualized cloud computing environment for latency at any resource in the virtualized cloud computing environment while performing the plurality of heterogeneous migration sessions; identifying an input/output (I/O) path to any resource in the virtualized cloud computing environment that is experiencing excessive I/O latency; determining a resource along the I/O path that is a bottleneck to the excessive I/O latency; using virtual-to-physical resource mapping information of resources in the virtualized cloud computing environment to obtain a list of the heterogeneous migration sessions contributing to the bottleneck at the identified I/O path; and throttling a migration rate of each heterogeneous migration session in the list of heterogeneous migration sessions in an amount that corresponds to the type of function performed by the migration session, the value that is attained by performing the migration session and a contribution portion designating a quantity that the migration session contributes to the bottleneck at the identified I/O path.

In a second embodiment, there is a computer system for throttling a plurality of heterogeneous migration sessions running concurrently in the virtualized cloud computing environment and sharing a same set of resources, wherein each heterogeneous migration session is characterized by a type of function performed and a value that is attained by performing the migration session. In this embodiment, the computer system comprises at least one processing unit and memory operably associated with the at least one processing unit. A heterogeneous migration sessions throttling tool is storable in memory and executable by the at least one processing unit. The heterogeneous migration sessions throttling tool comprises a monitoring component that monitors the virtualized cloud computing environment for latency at any resource in the virtualized cloud computing environment while performing the plurality of heterogeneous migration sessions. An identification component identifies an input/output (I/O) path to any resource in the virtualized cloud environment computing that is experiencing excessive latency, the identification component further configured to determine a resource along the I/O path that is a bottleneck to the excessive I/O latency. A virtual-to-physical resource mapping component contains virtual-to-physical resource mapping information of resources in the virtualized cloud computing environment and uses the mapping information to obtain a list of the heterogeneous migration sessions contributing to the bottleneck at the identified I/O path. A throttling component throttles a migration rate of each heterogeneous migration session in the list of heterogeneous migration sessions in an amount that corresponds to the type of function performed by the migration session, the value that is attained by performing the migration session and a contribution portion designating a quantity that the migration session contributes to the bottleneck at the identified I/O path.

In a third embodiment, there is a computer usable memory storing computer instructions, which when executed, enables a computer system to throttle a plurality of heterogeneous migration sessions running concurrently in the virtualized cloud computing environment and sharing a same set of resources. The executed computer instructions causes the computer system to perform a method comprising: initiating the plurality of heterogeneous migration sessions in a virtualized cloud computing environment, wherein each heterogeneous migration session is characterized by a type of function performed by the migration session and a value that is attained by performing the migration session; monitoring the virtualized cloud computing environment for latency at any resource in the virtualized cloud computing environment while performing the plurality of heterogeneous migration sessions; identifying an input/output (I/O) path to any resource in the virtualized cloud environment computing that is experiencing excessive resource congestion I/O latency; determining a resource along the I/O path that is a bottleneck to the excessive I/O latency; using virtual-to-physical resource mapping information of resources in the virtualized cloud computing environment to obtain a list of the heterogeneous migration sessions contributing to the bottleneck at the identified I/O path; and throttling a migration rate of each heterogeneous migration session in the list of heterogeneous migration sessions in an amount that corresponds to the type of function performed by the migration session, the value that is attained by performing the migration session and a contribution portion designating a quantity that the migration session contributes to the bottleneck at the identified I/O path.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1:
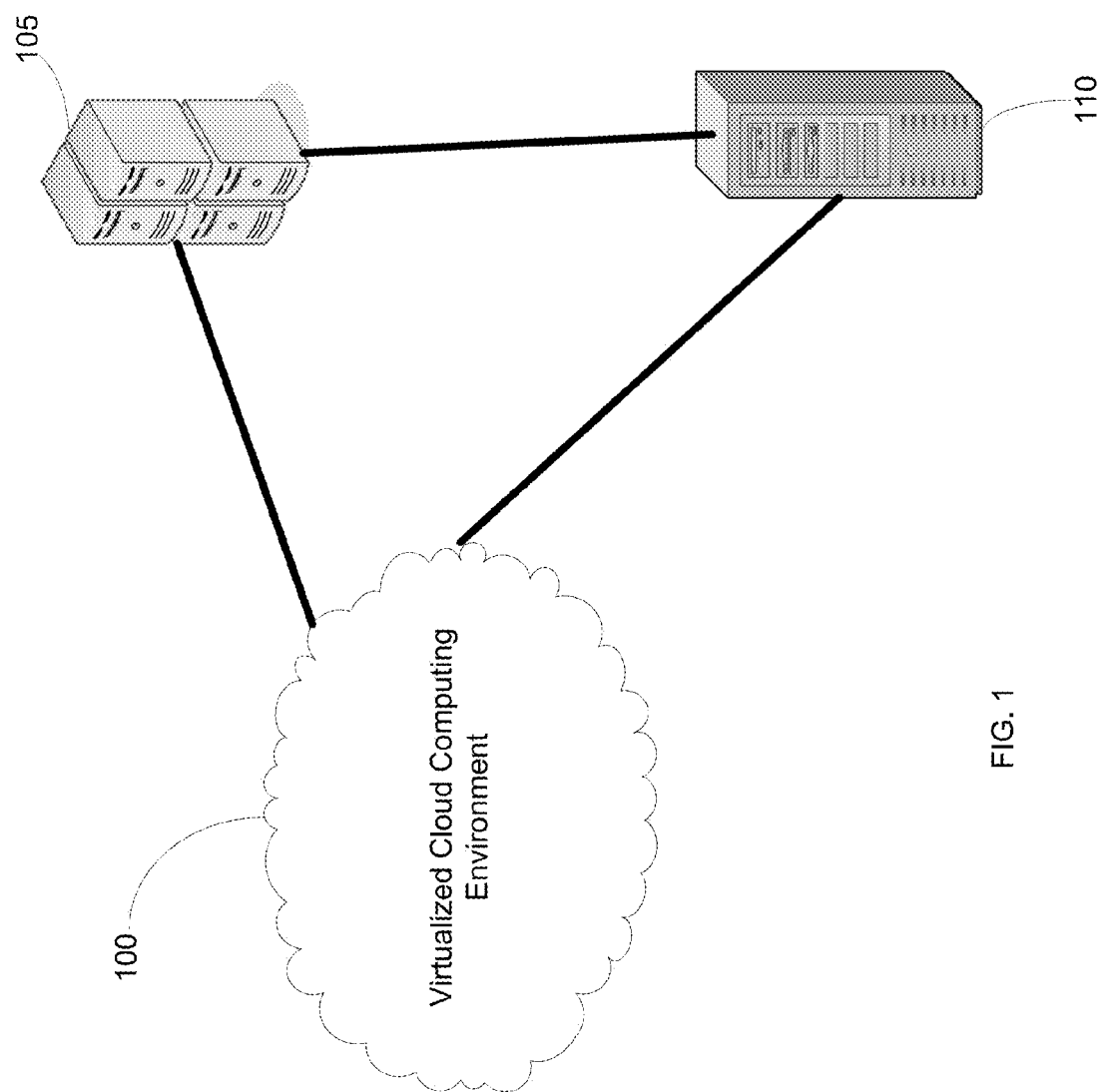
FIG. 1 shows a schematic diagram of a virtualized cloud computing environment in which embodiments of the present invention operate according to an embodiment of the present invention.

Referring now to the figures, FIG. 1 shows a schematic diagram of a virtualized cloud computing environment 100 in which embodiments of the present invention operate. Although not specifically illustrated in FIG. 1, virtualized cloud computing environment 100 can include a large number of server computers hosting data and applications that are connected through a real-time communication network. Virtual versions of devices or resources in virtualized cloud computing environment 100 are divided into one or more execution environments enabling the sharing of computational and storage resources. In this manner, physical resources such as processors, memory, network bandwidth and storage are abstracted in virtual pools for efficient resource utilization and improved manageability.

A monitoring and anomaly detection program 105 monitors virtualized cloud computing environment 100 for operational performance such as network congestion and resource overutilization. This can include monitoring virtualized cloud computing environment 100 for overutilization of resources and detecting congestion accessing resources. In operation, monitoring and anomaly detection program 105 can detect when an application/cloud user experiences excessive latency along its input/output (I/O) path, which was previously at an acceptable level. In one embodiment, monitoring and anomaly detection program 105 can detect excessive latency if a predetermined access latency threshold is exceeded. Monitoring and anomaly detection program 105 can be any commercially available program such as, for example, IBM TIVOLI Storage Productivity Center, TIVOLI Monitoring Tools, or VMWARE monitoring tools.

A virtualized cloud computing environment administration component 110 is in communication with monitoring and anomaly detection program 105 in order to reduce network congestion and/or resource overutilization in virtualized cloud computing environment 100. Virtualized cloud computing environment administration component 110 can perform other maintenance and monitoring operations in order to preserve operation of virtualized cloud computing environment 100. Although monitoring and anomaly detection program 105 and virtualized cloud computing environment administration component 110 are illustrated in FIG. 1 as different computing systems, these components can reside on the same system.

In various embodiments of the present invention, monitoring and anomaly detection program 105 and virtualized cloud computing environment administration component 110 can be used to monitor virtualized cloud computing environment 100 while a cloud administrator runs heterogeneous migration sessions, detect network congestion and resource overutilization that arise while performing the migration sessions, and throttle those migration sessions according to their contribution to the network congestion or resource overutilization to alleviate I/O latency. As used herein, throttling migration sessions is generally the reduction of the migration transfer rate of the objects, data or structures embodied by the migration session.

Figure 2:
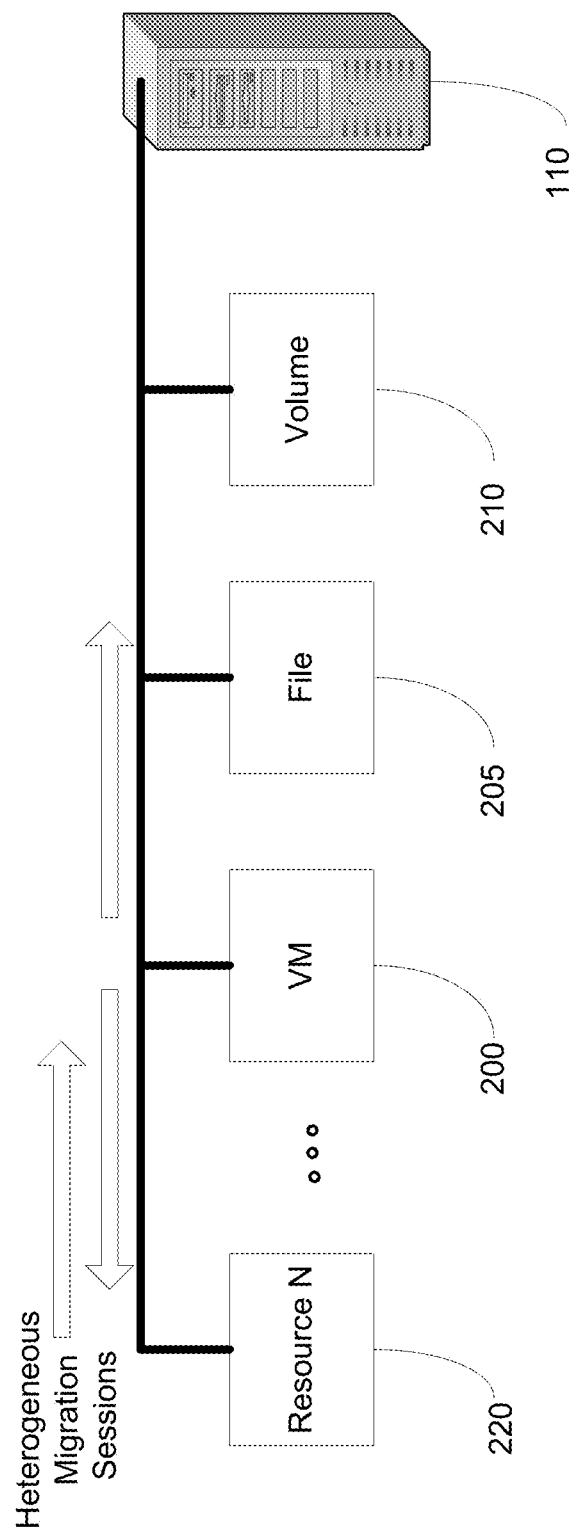
FIG. 2 shows a schematic diagram illustrating initiation of heterogeneous migration sessions by a cloud administrator in the virtualized cloud computing environment depicted in FIG. 1 according to an embodiment of the present invention.

FIG. 2 shows a schematic diagram illustrating initiation of heterogeneous migration sessions by a cloud administrator in the virtualized cloud computing environment depicted in FIG. 1 via virtualized cloud computing environment administration component 110. As used herein, a migration session includes any management task that involves data transfer and uses cloud resources. Heterogeneous migration sessions are migration sessions that migrate different types of objects, data or structures. For example, FIG. 2 illustrates migration sessions performed on a virtual machine (VM) 200, files 205, volumes 210, resource N 220. In this example, these multiple types of migration sessions coexist in the cloud, and may share a common resource (e.g., a network switch or a shared storage backend). In FIG. 2, VM 200, file 205, and volume 210 are the entities in this example that are being migrated. For example, migrating VM 200 from machine A to machine B can correspond to transfer X amount of data from machine A to machine B. Migrating file 205 can correspond to transfer Y amount of data from machine C to machine D. Migrating of volume 210 could be characterized in a similar manner. In any event, all migration sessions are actual "data transfers" happening in the cloud (or a data center), and each data transfer will utilize a cloud resource (e.g., a storage device needs to allocate CPU to take incoming I/O operations). Therefore, these sets of "data transfers", for management purposes, which are not initiated by the cloud user, may share the resource with workloads generated by cloud users and may affect their performance. Since the ultimate goal is to serve cloud users better, these management data transfers should be throttled if their resource utilization has a negative impact on the cloud users' applications. Those skilled in the art will appreciate that these heterogeneous migration sessions shown in FIG. 2 are only examples of some types of migration sessions that can be performed in a virtualized cloud computing environment 100 (FIG. 1) and are not intended to be limiting.

Heterogeneous migration sessions can be characterized by several attributes. One attribute is the type of function performed by the migration (e.g. volume, files, VM), which denotes the objective that is attained by performing the migration. For example, one migration session that entails migrating one VM to another VM can have a function that is to reduce a hotspot or lower congestion in the cloud. Another migration that entails migrating a storage box (e.g., a virtual disk) to another storage box can have a function that is to cache data.

Another attribute is the value of the migration session upon completing the session. Essentially, each function performed by the session provides a certain benefit or value to the cloud computing environment upon its completion. Thus, the value of the migration session depends on the function or objective of the migration. For example, if the migration type is a storage volume migration where the goal is to relocate a rarely accessed volume to a cheaper storage device, one method of calculating the value could be determined as: $s_i \cdot \text{value} = |\text{target I/O density} - \text{I/O density}| * \text{size}$. If the migration type is a file migration from a hard disk to cache where the goal is to reduce file access latency, the value of this migration session could be calculated by: $s_i \cdot \text{value} = \text{cache hit probability}$. Note that cache hit probability is the probability that a new request from users will ask for this particular file. For example, if a file is a popular movie that a lot of users will request, then this file can be deemed to have a big "hit probability." Therefore, in this example, this popular file can be placed in cache, instead of slower hard disk, to facilitate faster access. On the other hand, if another file has low popularity, and hence a small hit probability, it can be placed in the slow hard disk, saving the space of cache (with limited size) for those files that are popular, i.e., have a higher hit probability. Generally, a migration session's function determines the way that its value is calculated and evaluated. In one embodiment, high values for migration sessions with comparable objectives can imply less throttling.

Other attributes that can be used to characterize a migration session from other heterogeneous migrations sessions are the residual size and migration rate of the migration session. As used herein, the residual size is generally the remaining amount of data left to be migrated at the time of identifying a bottleneck. The migration rate is the rate at which the migration is performed.

The migration type of function, value, residual size and migration rate are only examples of some attributes that can be used to characterize and distinguish migration sessions from other heterogeneous migration sessions and are not intended to limit the various embodiments of the present invention. Those skilled in the art will appreciate that other attributes such as business impact, delay tolerance, the ownership of migration sessions (e.g., who initiated this migration session), etc., can be used to characterize heterogeneous migration sessions and throttle the migration sessions per the aspects described herein.

Figure 3:
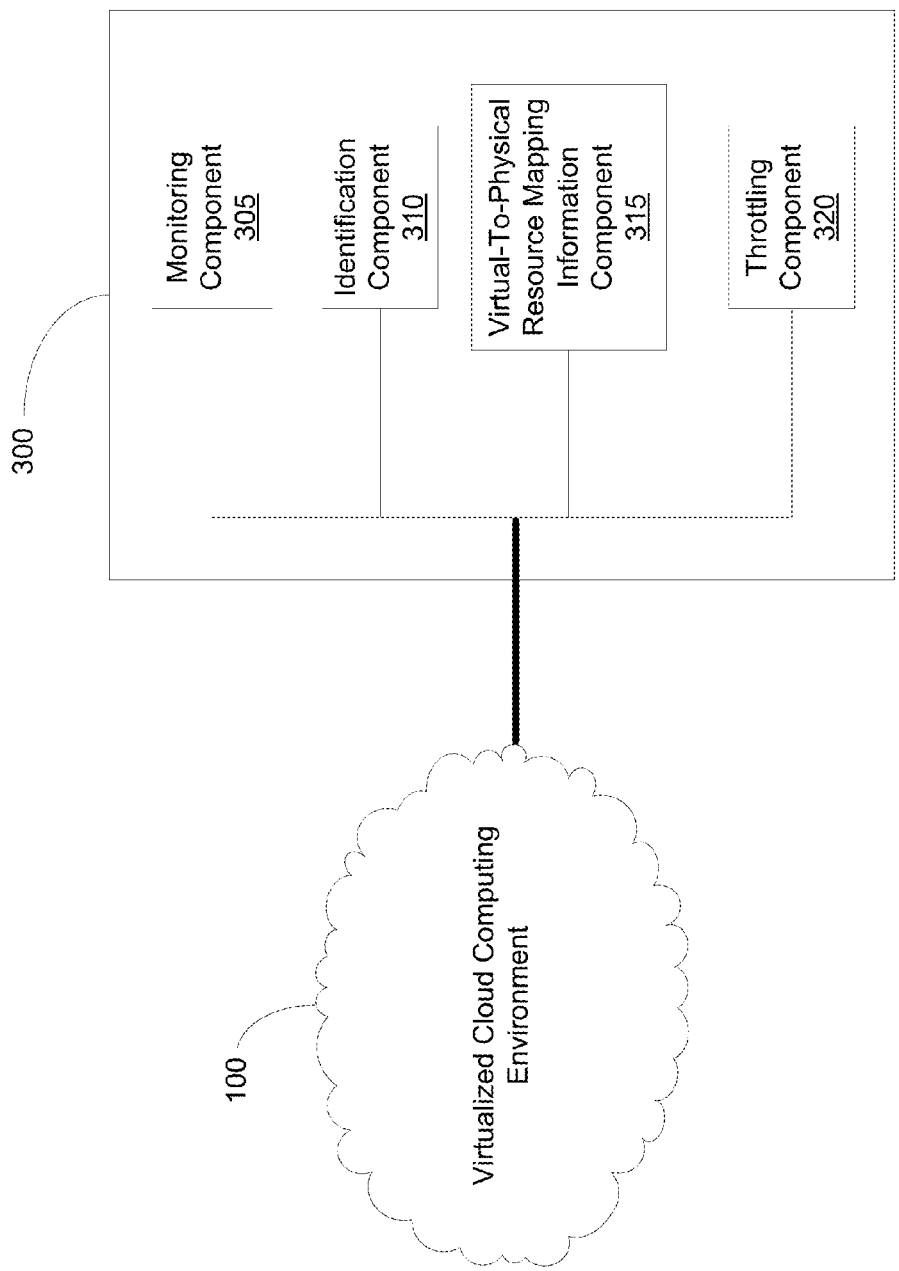
FIG. 3 shows a schematic diagram of a heterogeneous migration sessions throttling tool that can be used to throttle heterogeneous migration sessions according to an embodiment of the present invention.

FIG. 3 shows a schematic diagram of a heterogeneous migration sessions throttling tool 300 that can be used in the virtualized cloud computing environment administration component 110 (FIG. 1) to throttle heterogeneous migration sessions running concurrently in virtualized cloud computing environment 100 (FIG. 1) and sharing a same set of resources. As shown in FIG. 3, heterogeneous migration sessions throttling tool 300 includes monitoring component 305 that monitors virtualized cloud computing environment 100 while the heterogeneous migrations are running for anomalies such as I/O latency due to overutilization of resources, resource congestion, etc. Monitoring component 305 can work in conjunction with monitoring and anomaly detection program 105 (FIG. 1) to ascertain whether any I/O paths in virtualized cloud computing environment 100 are experiencing excessive latency since the initiation of the migration sessions. Monitoring component 305 can receive indications that monitoring and anomaly detection program 105 detected excessive latency in virtualized cloud computing environment 100 via well-known push/pull technologies. Once monitoring component 305 receives indications that an I/O path, which was operating normal before initiating the heterogeneous migration sessions, has exceeded a predetermined access latency, then heterogeneous migration sessions throttling tool 300 can initiate the throttling of troublesome migration sessions.

Throttling of troublesome migration sessions begins first with an identification component 310 that identifies the I/O path to the resource(s) in virtualized cloud environment computing 100 that is experiencing excessive I/O latency. Identification component 310 can then identify the bottleneck along the I/O path with excessive latency. As used herein, a bottleneck along an I/O path with excessive latency refers to the shared resource that is most severely overutilized on the I/O path and should be taken care of first to alleviate latency. In one embodiment, a bottom-up approach can be taken by starting from a storage volume and working up to the host, and labeling the first shared resource (e.g., storage pool, storage disk subsystems, network devices) with an excessive latency (i.e., exceeds a predetermined threshold) as the bottleneck. In another embodiment, a bottleneck can be pointed out by identifying the device on the congested I/O path that deviates its average response time the most in comparison to other resources on the I/O path. Once the bottleneck is identified, then all contributing migration sessions that traverse this bottleneck can be identified.

A virtual-to-physical resource mapping information component 315 containing virtual-to-physical resource mapping information of resources in virtualized cloud computing environment 100 can be used to identify all migration sessions that traverse this bottleneck and contribute thereto. In one embodiment, this information can be obtained by querying the virtualization layer. For example, in a storage virtualization aspect, a device will perform storage virtualization by mapping virtual disks to physical disks, and this mapping relationship information is stored in a table that can be queried. As described below, virtual-to-physical resource mapping information component 315 uses the virtual-to-physical resource mapping information for differentiating migration sessions sharing the same device or resource identified as the bottleneck by calculating each session's "contributing portion" to the bottleneck.

Virtual-to-physical resource mapping information component 315 determines each migration session's contributing portion to the bottleneck by using the virtual-to-physical resource mapping information to first obtain a list of the heterogeneous migration sessions that traverse this bottleneck and contribute to the congestion. In one embodiment, the list or set of migration sessions that traverse the bottleneck and contribute to the congestion can be denoted by S. In one embodiment, for each contributing migration session $s_i$ in set S, the session's attributes are used to determine each migration session's priority in contributing to the bottleneck, which in turn, determines the amount that it will be throttled to alleviate the latency along the congested I/O path. The attributes can include the migration type (e.g. volume, files, VM) which denotes the function or objective of the migration session, a value that captures the benefit of the migration session upon completion (depends on the objective of the migration), residual size of the migration session that is left to be completed, and a contribution portion that indicates the amount that the session contributes to the bottleneck.

In one embodiment, a contribution portion, cp, can be a numeric value that can be calculated as: $s_i \cdot cp$=current migration rate×fraction (e.g., 1, ½, ¼, ...). Due to heterogeneous virtual-to-physical resource mappings, migration sessions in S may contribute different portions of load to the bottleneck. As an example, consider migrations A and B that are both contributing to a congested storage subsystem. Migration session A can contribute all load to the bottleneck, while migration session B only contributes ⅔ of its total load (60 MB/s) to the bottleneck due to different virtual volume to physical disk mappings. According to embodiments described herein, an efficient throttling solution can throttle migration session A more than migration session B due to A's larger contribution portion. Migrations with smaller contribution portion values can be throttled less since it unnecessarily prolongs their completion time while having marginal impact on alleviating a bottleneck.

A throttling component 320 can use the list of heterogeneous migration sessions generated from virtual-to-physical resource mapping information component 315 along with each session's contributed portion to throttle the heterogeneous sessions. Generally, throttling component 320 throttles a migration rate of each migration session in the list of heterogeneous migration sessions in an amount that corresponds to the type of function performed by the migration session, the value associated with the migration session, and the contribution portion to the congestion at the identified I/O path. Other attributes used in the throttling can include the residual size and the migration rate of each migration session in the list.

Throttling component 320 can use the above-noted attributes to throttle the migration session to attain a predetermined initial total target traffic reduction. In one embodiment, the predetermined initial target rate reduction can be set to a predetermined value (e.g., 400 MB/s). In other words, after congestion or overutilization is detected, the cloud administrator can first attempt to reduce the aggregate migration rate or speed by a predetermined amount (e.g. 400 MB/s). This total rate reduction can then be shared by all sessions in the list or set S that contribute to the bottleneck.

Throttling component 320 can allocate the predetermined initial total target traffic reduction to each of the sessions in the list of heterogeneous migration sessions by first assigning each migration session into a classification group according to their functions or objectives. In this manner, migration sessions having common functions are assigned to a similar classification group and migration sessions having different objective functions are assigned to different classification groups. In one embodiment, the migration sessions in each classification group can be prioritized according to their functions and their contribution portion.

Throttling component 320 can now determine an aggregate migration rate of the migration sessions in each classification group in order to ascertain how much each group contributes to the bottleneck. In one embodiment, the aggregate migration rate includes the sum of transfer rates of each heterogeneous migration session in each classification group. For example, if group 1 has two sessions with transfer rates of 60 MB/s and 40 MB/s, then the aggregate rate for this group is 100 MB/s.

Next, throttling component 320 can apportion the predetermined initial total target traffic reduction rate to each of the classification groups to obtain a group level rate reduction target for each group (i.e., the amount that each session in a group should be reduced). In one embodiment, each group level rate reduction target is in proportion to the aggregate migration rate determined for the group. For example, if there are three groups (Group 1, Group 2, Group 3) with aggregate rates of 500 MB/s, 250 MB/s, and 250 MB/s, then the total rate reduction of 400 MB/s can be allocated as follows: Group 1's aggregate rate is reduced to 200 MB/s; Group 2's aggregate rate is reduced to 100 MB/s; and Group 3's aggregate rate is reduced to 100 MB/s.

If desired, those skilled in the art will appreciate that it is straightforward to extend the above-mentioned proportional allocation scheme to a general weighted allocation solution, where each group has a weight to capture other business concerns such as the business value of this group of migrations, the risk/penalty/criticality of delaying this group of migrations, etc. In this manner, the total rate reduction could be shared by all groups according to their weights.

Once the group rate reduction target is determined, throttling component 320 can allocate this group rate reduction target to each migration session within this group. In one embodiment, this in-group allocation can be implemented as follows. Within each group, all sessions can be ranked in decreasing order according to the following metric:

$$\frac{s_i.rs \times s_i.cp}{s_i.\text{value}},$$

where
  $s_i.rs$ is the current residual size;
  $s_i.cp$ is the contributing portion; and
  $s_i.\text{value}$ is the calculated value deemed for the migration.
After all sessions within the group are ordered, throttling component 320 can determine each session's rate reduction according to its rank in the ordered list. In one embodiment, a simple greedy approach can be used to pause sessions in the ordered list one by one until the group rate reduction target is reached.

Throttling component 320 can then initiate new migration sessions as a function of each of the group level rate reduction targets. Note that when a new migration session is initiated during the throttling phase, the new migration session can be started with a predetermined default rate, e.g., 60 MB/s. When a migration session finishes during the throttling phase, then the allocation of the group rate reduction target to each migration session in a classification group can be repeated.

After throttling the migration sessions, it may be necessary for throttling component 320 to increase the total target traffic reduction rate by predetermined amount if congestion at the bottleneck remains. Generally, after the initial target rate reduction is reached, virtualized cloud computing environment administration component 110 will query monitoring and anomaly detection program 105 to check whether the throttling has eliminated the congestion and whether the bottleneck's response time has fallen below a predetermined threshold. In another embodiment, monitoring and anomaly detection program 105 can check after a predetermined stopping criterion is reached, e.g., minimum rate requirement for migration sessions. If it is determined that the bottleneck still exists, the migration manager can further increase the total rate reduction target by a predetermined delta amount, e.g., further reduce 50 MB/s and apply that to heterogeneous migration sessions throttling tool 300 for rethrottling of the migration sessions in proportion to the increased total target traffic reduction rate. Note that setting the minimum rate of migration sessions to zero simply implies that all migration sessions should be paused if necessary.

Throttling and rethrottling can continue until the congestion/overutilization is solved or a predetermined stopping criterion is met, e.g., the minimum rate requirement of migrations sessions is reached and no further throttling is allowed. Even though heterogeneous migration sessions throttling tool 300 may eliminate one bottleneck, this iteration may be necessary to address an application's access latency along the I/O path that is still exceeding the predetermined threshold. This additional step will iterate the above steps in case the throttling mechanism eliminates one bottleneck yet the application's access latency along the I/O path still exceeds the predetermined threshold. In other words, while throttling in above manner may solve the overutilization for one device along the I/O path, another device on the I/O path may become the new bottleneck and deteriorate the performance to an unacceptable level. Therefore, an additional iteration will identify the new bottleneck and continue the throttling process until the problem is solved, or a predetermined stopping criterion is met, and no further throttling is allowed.

Figure 4:
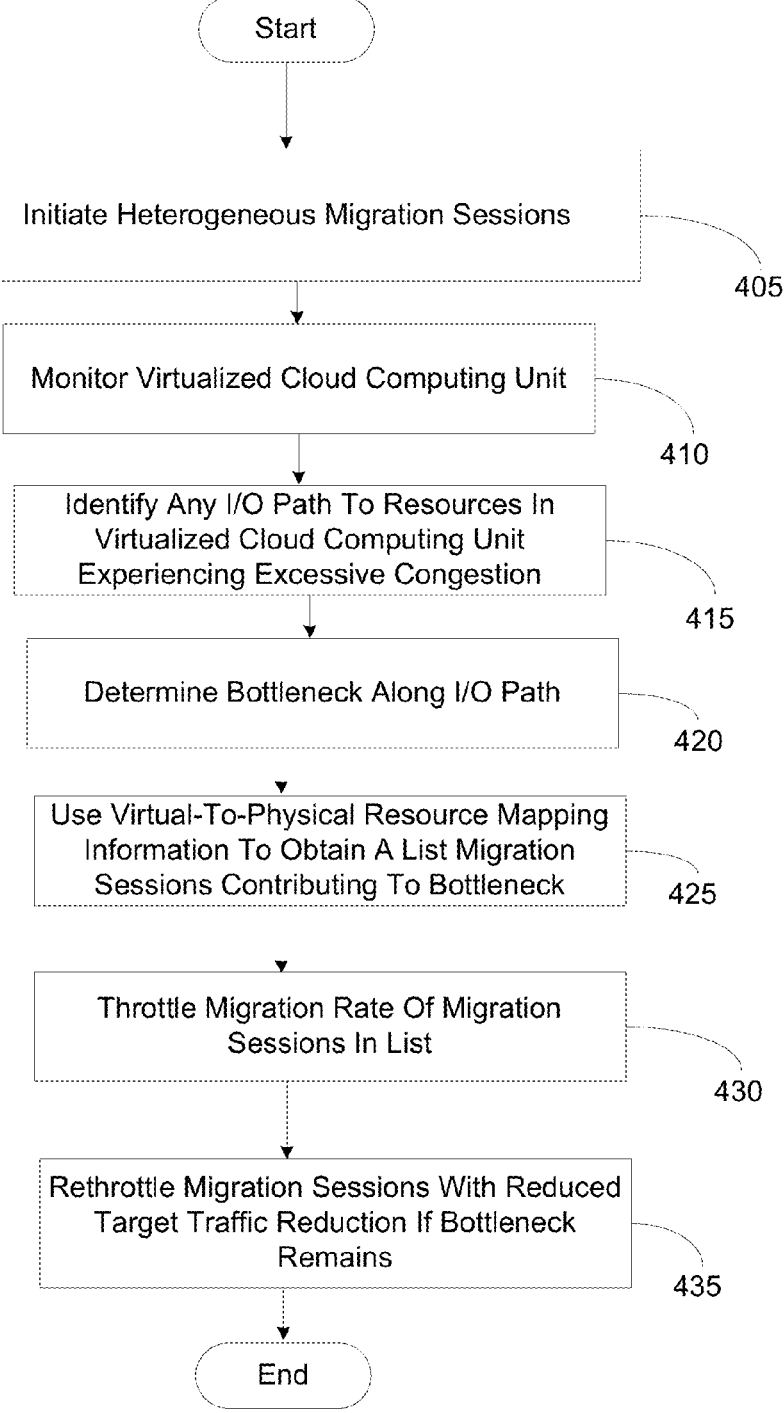
FIG. 4 shows a flow diagram illustrating some operations performed by the heterogeneous migration sessions throttling tool according to an embodiment of the present invention.

FIG. 4 shows a flow diagram 400 illustrating operations of throttling heterogeneous migration sessions according to one embodiment of this invention. First, a plurality of heterogeneous migration sessions are initiated in a virtualized cloud computing environment at 405. Each of the migration sessions run concurrently in the virtualized cloud computing environment and share a same set of resources. The heterogeneous migration sessions are characterized by attributes that can include a function or type of migration session that is performed, value that is attained by performing the migration session, residual size, etc.

Figure 5:
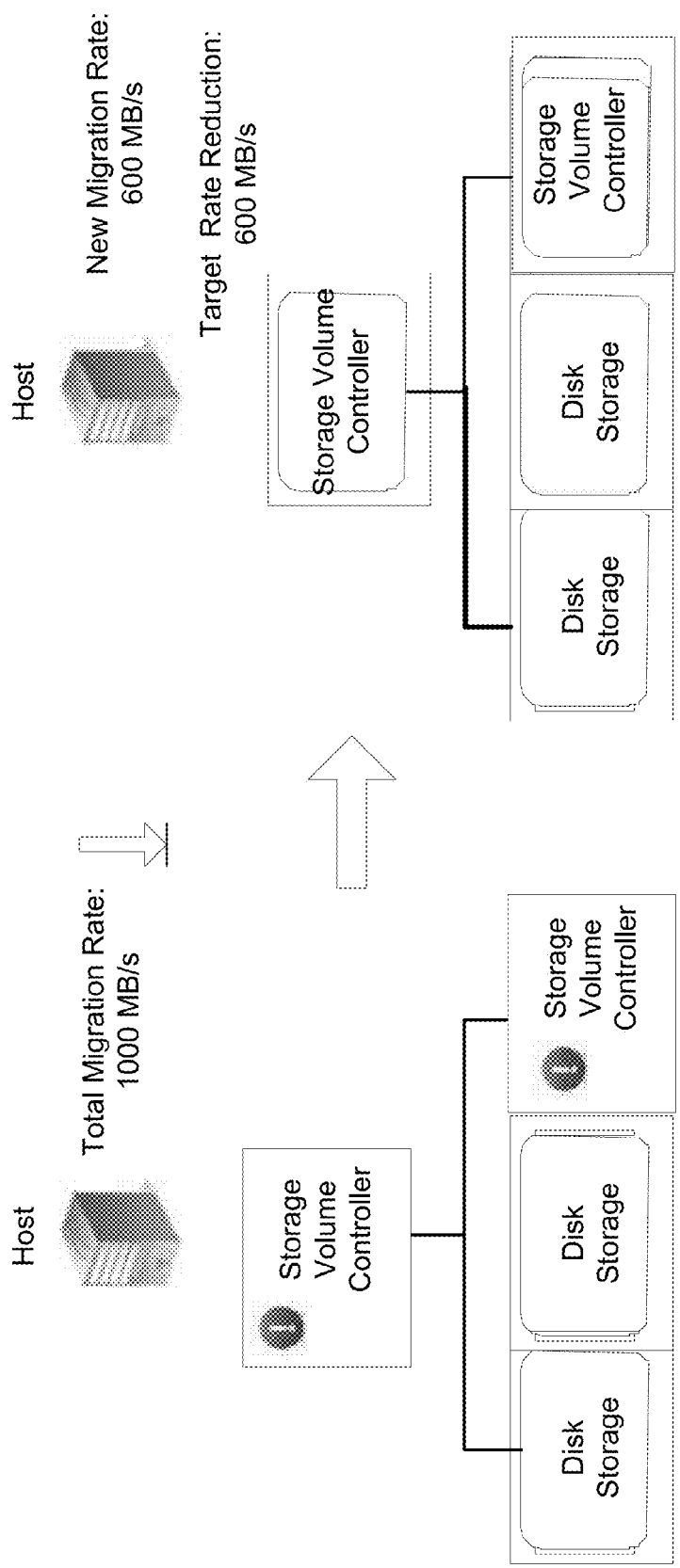
FIG. 5 is an example illustrating the heterogeneous migration sessions throttling tool identifying a bottleneck in an input/output (I/O) path experiencing excessive congestion according to an embodiment of the present invention.

The virtualized cloud computing environment is monitored at 410 for latency at any resource in the virtualized cloud computing while performing the migration sessions. An I/O path to any resource in the virtualized cloud computing environment that is experiencing excessive I/O latency is identified at 415. Next, a determination is made at 420 as to which resource or device along this I/O path is the bottleneck to the excessive I/O latency. FIG. 5 shows an example in which a resource is identified as the bottleneck to a particular I/O path. In this example, a storage volume controller is identified as the bottleneck with the exclamation icon. In this example, a total migration rate is reduced from 1000 MB/s to 600 MB/s and apportioned to migration sessions that traverse this bottleneck in order to alleviate the excessive I/O latency.

Referring back to FIG. 4, virtual-to-physical resource mapping information of resources in the virtualized cloud computing environment is used at 425 to obtain a list of the heterogeneous migration sessions contributing to the bottleneck at the identified I/O path. Referring again to FIG. 5, the virtual-to-physical resource mapping information can be used to obtain the set of migration sessions contributing load to the storage volume controller. For each contributing migration session, its attributes are recorded to determine each migration's priority, which in turn determines the amount that it will be throttled.

Figure 6:
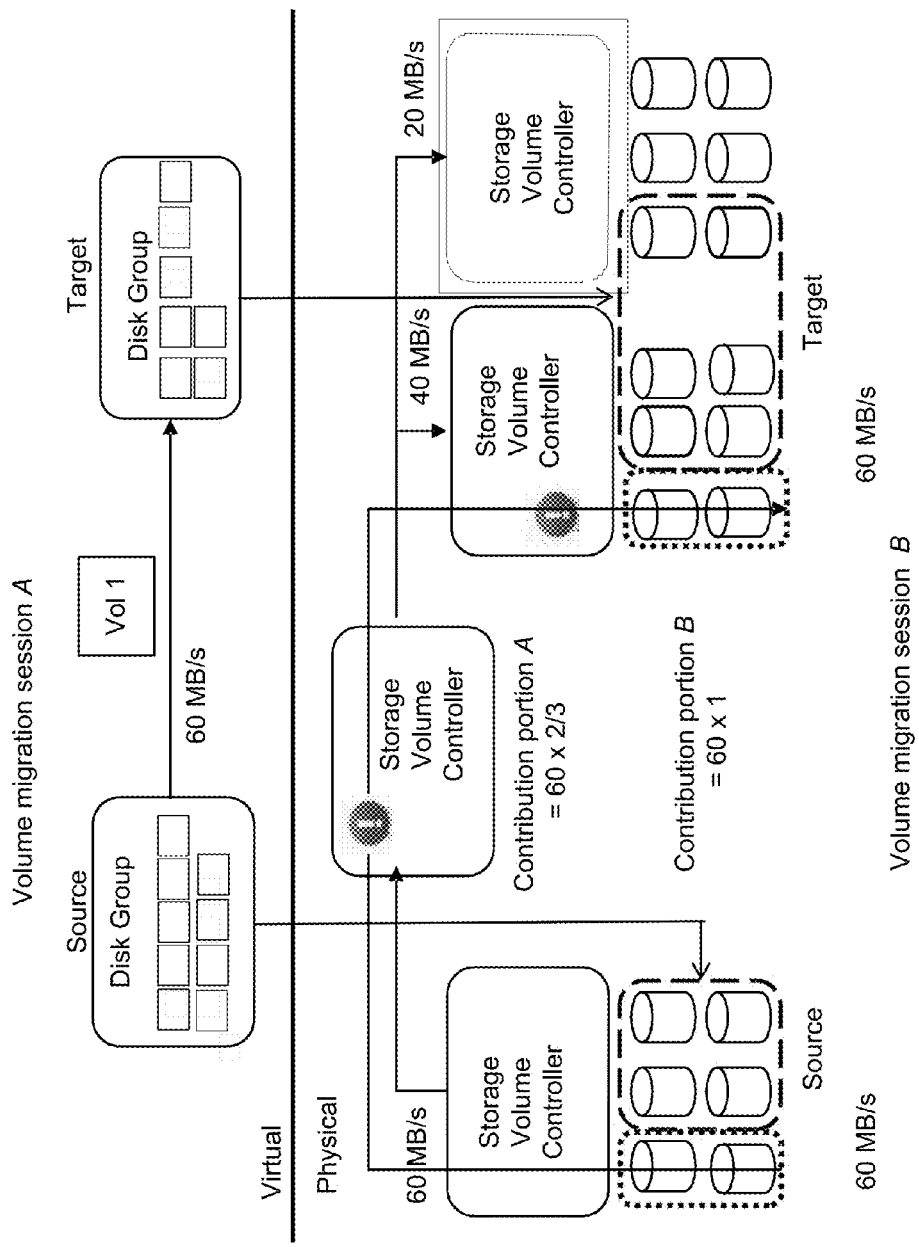
FIG. 6 is an example illustrating the heterogeneous migration sessions throttling tool utilizing virtual-to-physical resource mapping information to obtain a list of heterogeneous migration sessions contributing to a bottleneck along with their contribution portions to the bottleneck according to an embodiment of the present invention.

Referring back to FIG. 4, after obtaining the list of heterogeneous migration sessions, a migration rate of each session in the list is throttled at 430 in an amount that corresponds to the type function performed by of the migration session, the value associated with the migration session and a contribution portion designating a quantity that the migration session contributes to the bottleneck at the identified I/O path. Due to heterogeneous virtual-to-physical resource mappings, migration sessions in list of heterogeneous migration sessions may contribute different portions of load to the bottleneck. For example, as illustrated in FIG. 6, volume migrations A and B are both contributing to the congested storage volume controller subsystem. However, while migration session A contributes all load (60 MB/s in the example) to the bottleneck, migration session B only contributes ⅔ (40 MB/s) of its total load (60 MB/s) to the bottleneck due to different virtual volume to physical disk mappings. Therefore, an efficient throttling solution described herein can throttle migration session A more than migration session B due to A's larger contribution portion. Migrations with smaller contribution portion values are throttled less since it unnecessarily prolongs their completion time while having marginal impact on alleviating the bottleneck.

Figure 7:
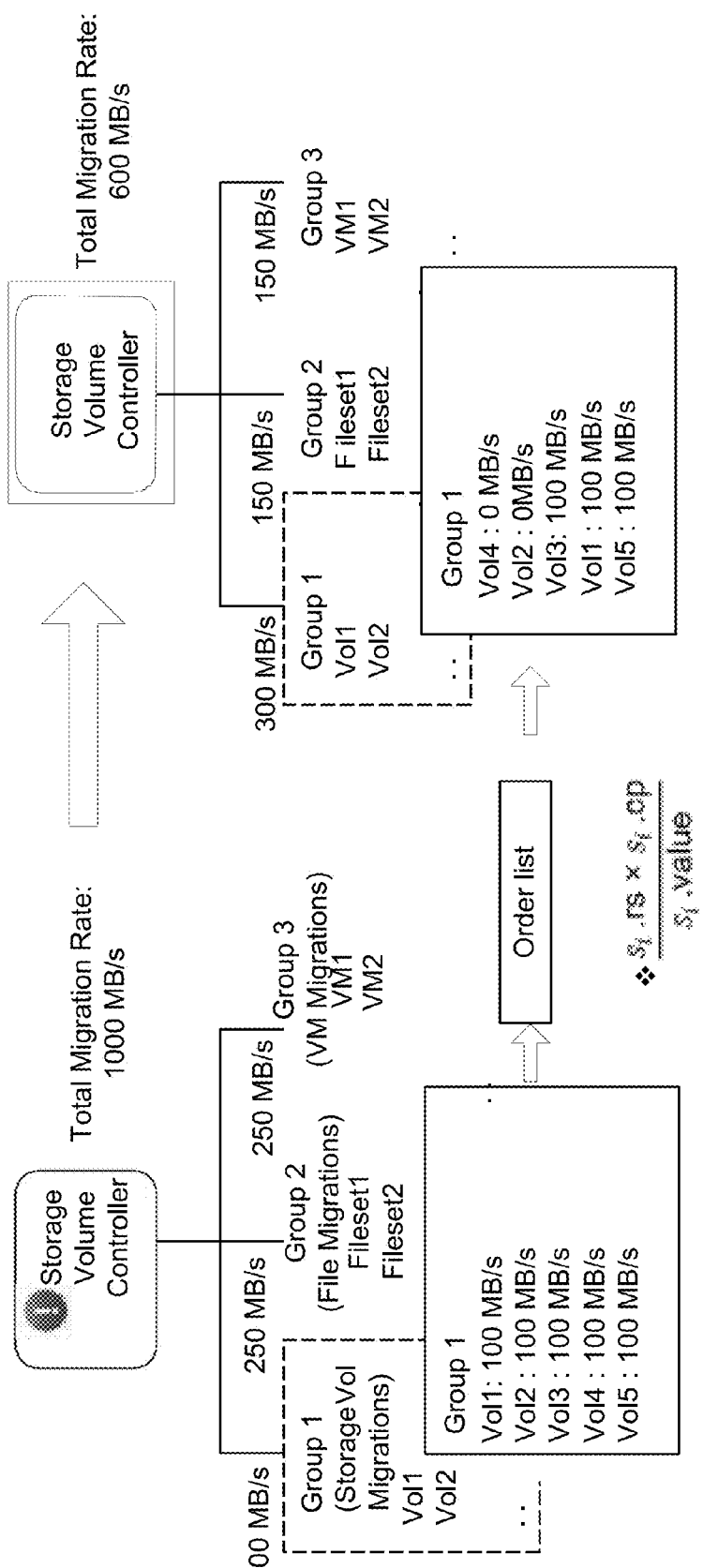
FIG. 7 is an example illustrating the heterogeneous migration sessions throttling tool throttling heterogeneous migration sessions according to a target traffic reduction according to an embodiment of the present invention.

FIG. 7 illustrates another example of throttling heterogeneous migration sessions according to various embodiments of the present invention. In FIG. 7, the storage volume controller labeled with the exclamation icon is identified as the bottleneck. In order to alleviate this bottleneck, the total migration rate is reduced from 1000 MB/s to 600 MB/s. The 1000 MB/s can be allocated to several classification groups that are categorized according to their type of function performed. In particular, the 1000 MB/s can be allocated according to the contributing portion to the bottleneck. In this example, sessions in Group 1 change from 500 MB/s to 300 MB/s, sessions in Group 2 change from 250 MB/s to 150 MB/s, and sessions in Group 3 change from 250 MB/s to 150 MB/s. That is, the migration rate in Group 1 is reduced by 200 MB/s, the migration rate in Group 2 is reduced by 100 MB/s, and the migration rate in Group 3 is reduced by 100 MB/s, facilitating a total traffic reduction of 400 MB/s.

The total traffic reduction can then be allocated to each of the migration sessions in the group. Since Group 1 is reduced by 200 MB/s, this has to be allocated to all of the sessions in this group. Similarly, the 100 MB/s has to be allocated to all of the sessions in each of these groups. Using the approaches described above, the 400 MB/s has to be allocated proportionally to their contributing portions. Since Group 1 has twice the rate of Groups 2 and 3, Group 1 needs to be twice that of Groups 2 and 3. As shown in the example, Group 1, volumes 1, 3 and 5 are deemed more important to the bottleneck than volumes 2 and 4, and thus are allocated 100 MB/s whereas volumes 2 and 4 were allocated 0 MB/s. The allocations of the fileset in Group 2 and VM in Group 3 would be allocated in a similar manner using ranking of each migration session per the illustrated equation.

Figure 8:
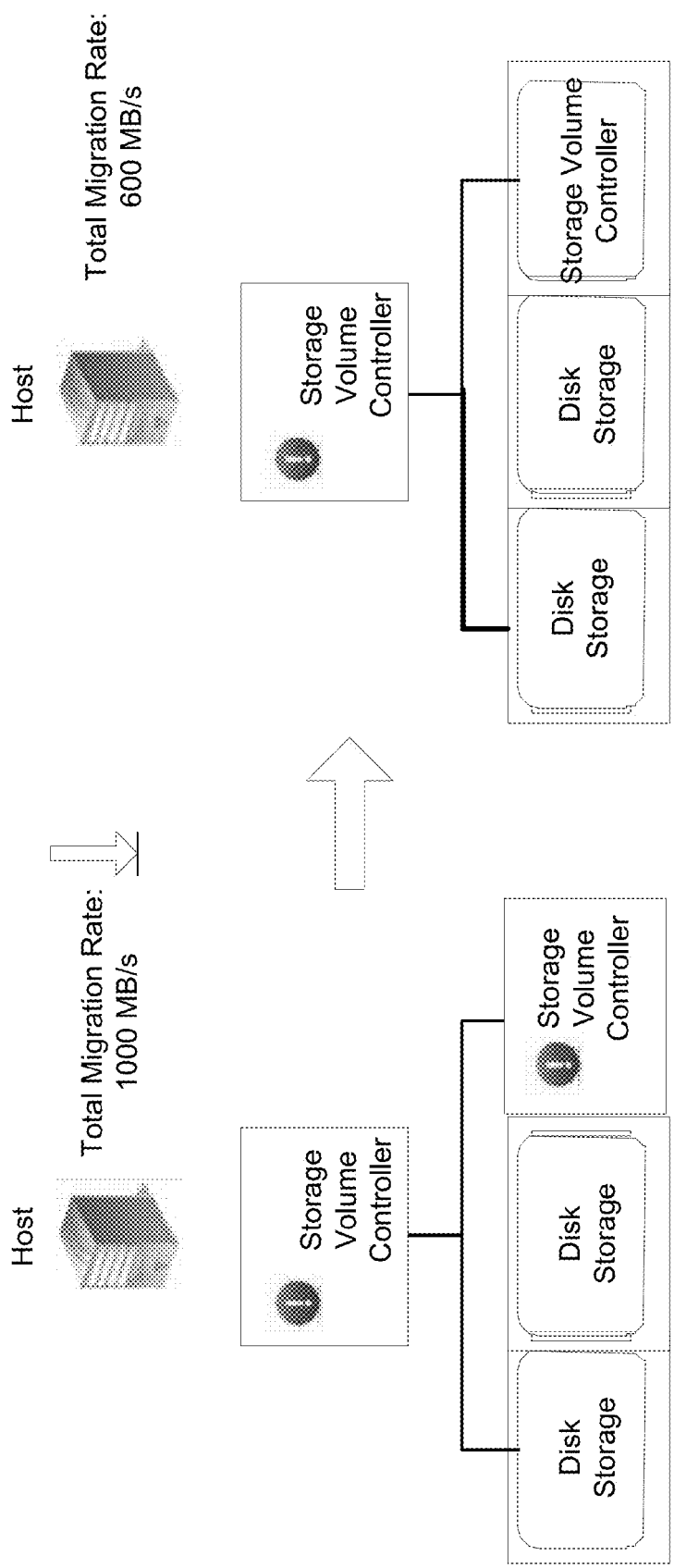
FIG. 8 is an example illustrating the need for the heterogeneous migration sessions throttling tool to increase the target rate reduction for rethrottling of heterogeneous migration sessions according to an embodiment of the present invention.

Referring back to FIG. 4, after throttling, the migration session may need to be rethrottled at 435 if the bottleneck remains. In particular, the amount of target rate reduction may need to be increased until the bottleneck's response time is below the threshold or if a minimum rate requirement has not been met. FIG. 8 illustrates an example in which the bottleneck still remains after reducing the total migration rate from 1000 MB/s to 600 MB/s. In this case, an attempt to alleviate the bottleneck can be tried by reducing the total migration rate from 600 MB/s to 400 MB/s. These steps described with respect to FIG. 4 can be repeated until the problem is solved or it can be stopped when a predetermined stopping criteria is reached, e.g., a minimum rate requirement.

The foregoing flow chart shows some of the processing functions associated with reactively throttling heterogeneous migration sessions utilizing virtualization information and the sessions' contributing portion to a bottleneck. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 9:
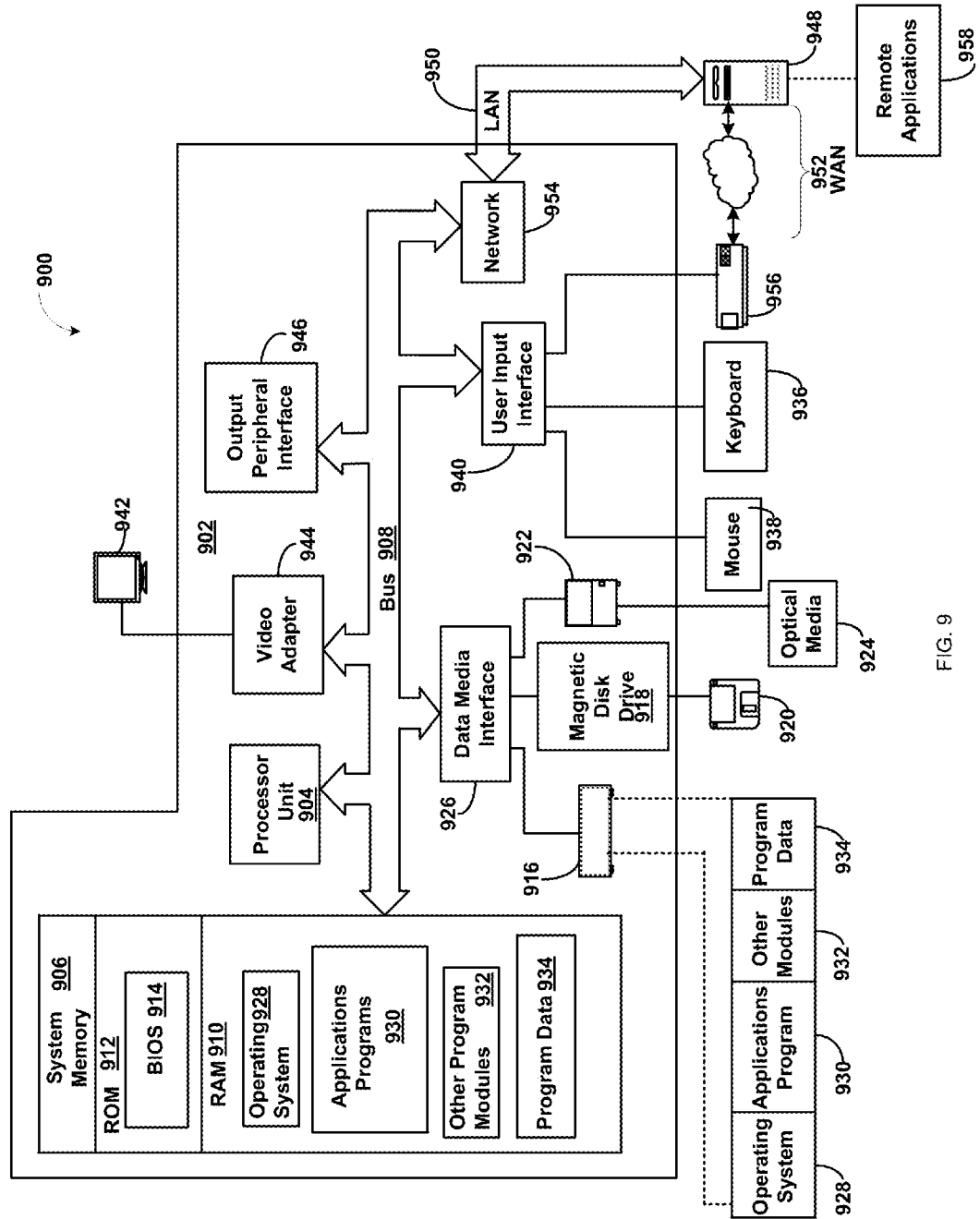
FIG. 9 is a schematic of a computing environment in which elements of the heterogeneous migration sessions throttling tool may operate according to an embodiment of the present invention.

FIG. 9 shows a schematic of a computing environment in which elements of the heterogeneous migration sessions throttling tool may operate. The exemplary computing environment 900 is only one example of a suitable computing environment and is not intended to suggest any limitation as to the scope of use or functionality of the approach described herein. Neither should the computing environment 900 be interpreted as having any dependency or requirement relating to any one or combination of components illustrated in FIG. 9.

In the computing environment 900 there is a computer 902 which is operational with numerous other general purpose or special purpose computing system environments or configurations. Examples of well known computing systems, environments, and/or configurations that may be suitable for use with an exemplary computer 902 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 902 may be described in the general context of computer-executable instructions, such as program modules, being executed by a computer. Generally, program modules include routines, programs, objects, components, logic, data structures, and so on, that performs particular tasks or implements particular abstract data types. The exemplary computer 902 may be practiced in distributed computing environments where tasks are performed by remote processing devices that are linked through a communications network. In a distributed computing environment, program modules may be located in both local and remote computer storage media including memory storage devices.

As shown in FIG. 9, the computer 902 in the computing environment 900 is shown in the form of a general-purpose computing device. The components of computer 902 may include, but are not limited to, one or more processors or processing units 904, a system memory 906, and a bus 908 that couples various system components including the system memory 906 to the processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 902 typically includes a variety of computer readable media. Such media may be any available media that is accessible by computer 902, and it includes both volatile and non-volatile media, removable and non-removable media.

In FIG. 9, the system memory 906 includes computer readable media in the form of volatile memory, such as random access memory (RAM) 910, and/or non-volatile memory, such as ROM 912. A BIOS 914 containing the basic routines that help to transfer information between elements within computer 902, such as during start-up, is stored in ROM 912. RAM 910 typically contains data and/or program modules that are immediately accessible to and/or presently operated on by processor 904.

Computer 902 may further include other removable/non-removable, volatile/non-volatile computer storage media. By way of example only, FIG. 9 illustrates a hard disk drive 916 for reading from and writing to a non-removable, non-volatile magnetic media (not shown and typically called a "hard drive"), a magnetic disk drive 918 for reading from and writing to a removable, non-volatile magnetic disk 920 (e.g., a "floppy disk"), and an optical disk drive 922 for reading from or writing to a removable, non-volatile optical disk 924 such as a CD-ROM, DVD-ROM or other optical media. The hard disk drive 916, magnetic disk drive 918, and optical disk drive 922 are each connected to bus 908 by one or more data media interfaces 926.

The drives and their associated computer-readable media provide nonvolatile storage of computer readable instructions, data structures, program modules, and other data for computer 902. Although the exemplary environment described herein employs a hard disk 916, a removable magnetic disk drive 918 and a removable optical disk 922, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 916, magnetic disk 920, optical disk 922, ROM 912, or RAM 910, including, by way of example, and not limitation, an operating system 928, one or more application programs 930 (e.g., the migration sessions throttling tool), other program modules 932, and program data 934. Each of the operating system 928, one or more application programs 930 other program modules 932, and program data 934 or some combination thereof, may include an implementation of the heterogeneous migration sessions throttling tool shown in FIG. 3.

A user may enter commands and information into computer 902 through optional input devices such as a keyboard 936 and a pointing device such as a mouse 938. Other input devices (not shown) may include a microphone, joystick, game pad, satellite dish, serial port, scanner, camera, or the like. These and other input devices are connected to the processor unit 904 through a user input interface 940 that is coupled to bus 908, but may be connected by other interface and bus structures, such as a parallel port, game port, or a universal serial bus (USB).

An optional monitor 942 or other type of display device is also connected to bus 908 via an interface, such as a video adapter 944. In addition to the monitor, personal computers typically include other peripheral output devices (not shown), such as speakers and printers, which may be connected through output peripheral interface 946.

Computer 902 may operate in a networked environment using logical connections to one or more remote computers, such as a remote computer 948 (e.g., a server computer). Remote computer 948 may include many or all of the elements and features described herein relative to computer 902.

Logical connections shown in FIG. 9 are a local area network (LAN) 950 and a general wide area network (WAN) 952. Such networking environments are commonplace in offices, enterprise-wide computer networks, intranets, and the Internet. When used in a LAN networking environment, the computer 902 is connected to LAN 950 via network 954 and a network adapter or interface. When used in a WAN networking environment, the computer typically includes a modem 956 or other means for establishing communications over the WAN 952. The modem, which may be internal or external, may be connected to the system bus 908 via the user input interface 940 or other appropriate mechanism.

In a networked environment, program modules depicted relative to the personal computer 902, or portions thereof, may be stored in a remote memory storage device. By way of example, and not limitation, FIG. 9 illustrates remote applications 958 as residing on a memory device of remote computer 948. It will be appreciated that the network connections shown and described are exemplary and other means of establishing a communications link between the computers may be used.

An implementation of an exemplary computer 902 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing a heterogeneous migration sessions throttling tool. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, comprising:
   initiating, by a cloud administrator, a plurality of heterogeneous migration sessions in a virtualized cloud computing environment, the plurality of heterogeneous migration sessions running concurrently in the virtualized cloud computing environment and sharing a same set of resources, wherein each heterogeneous migration session is characterized by a type of function performed by the migration session and a value that is attained by performing the migration session;
   monitoring the virtualized cloud computing environment for latency at any resource in the virtualized cloud computing environment while performing the plurality of heterogeneous migration sessions;
   identifying an input/output (I/O) path to any resource in the virtualized cloud computing environment that is experiencing excessive I/O latency;
   determining a resource along the I/O path that is a bottleneck to the excessive I/O latency;
   using virtual-to-physical resource mapping information of resources in the virtualized cloud computing environment to obtain a list of the heterogeneous migration sessions contributing to the bottleneck at the identified I/O path, wherein a migration type, a completion benefit, and a bottleneck contribution portion for each heterogeneous migration session is used to determine a priority of contribution to the bottleneck; and
   throttling a migration rate of each heterogeneous migration session in the list of heterogeneous migration sessions in an amount that corresponds to the migration type, the completion benefit that is attained by performing the migration session and the bottleneck contribution portion designating a quantity that the migration session contributes to the bottleneck at the identified I/O path.

2. The method according to claim 1, wherein the completion benefit is to relocate a rarely accessed volume to a different storage device.

3. The method according to claim 1, wherein the identifying of an I/O path to any resource in the virtualized cloud environment computing occurs in response to detecting that access latency to a resource exceeds a predetermined latency threshold.

4. The method according to claim 1, wherein the list of migration sessions contributing to the bottleneck at the identified I/O path includes the contribution portion associated with each migration session that designates the quantity that the migration session contributes to the bottleneck.

5. The method according to claim 1, wherein the throttling of a migration rate of each heterogeneous migration session in the list of heterogeneous migration sessions is performed in accordance with a predetermined initial total target traffic reduction rate.

6. The method according to claim 5, wherein the throttling of a migration rate of each heterogeneous migration session in the list of heterogeneous migration sessions includes:
   assigning each migration session into a classification group according to the type of function performed, wherein heterogeneous migration sessions having common functions are assigned to similar classification groups and heterogeneous migration sessions having different functions are assigned to different classification groups; and
   prioritizing the migration sessions in each classification group according to the type of function performed and the contribution portion associated therewith.

7. The method according to claim 6, further comprising:
   determining an aggregate migration rate of the migration sessions in each classification group, the aggregate migration rate including a sum of transfer rates of each migration session in each classification group, the aggregate migration rate of each classification group is indicative of an amount that each group contributes to the bottleneck; and
   apportioning the predetermined initial total target traffic reduction rate to each of the classification groups to obtain a group level rate reduction target for each group, wherein each group level rate reduction target is in proportion to the aggregate migration rate determined therefor.

8. The method according to claim 7, further comprising allocating the group level rate reduction target to each migration session in each classification group.

9. The method according to claim 7, further comprising initiating new migration sessions as a function of each of the group level rate reduction targets.

10. The method according to claim 9, further comprising increasing a total target traffic reduction rate by a predetermined amount if congestion remains.

11. The method according to claim 10, further comprising rethrottling the
   migration rate of each heterogeneous migration session in proportion to the increased total target traffic reduction rate.

12. A computer system for throttling a plurality of heterogeneous migration sessions running concurrently in a virtualized cloud computing environment and sharing a same set of resources, wherein each heterogeneous migration session is characterized by a type of function performed and a value that is attained by performing the migration session, the computer system comprising:
   at least one processing unit;
   memory operably associated with the at least one processing unit; and
   a heterogeneous migration sessions throttling tool storable in memory and executable by the at least one processing unit, the tool comprising:
      a monitoring component that monitors the virtualized cloud computing environment for latency at any resource in the virtualized cloud computing environment while performing the plurality of heterogeneous migration sessions, said plurality of heterogeneous migration sessions being initiated by at least one cloud administrator;
      an identification component that identifies an input/output (I/O) path to any resource in the virtualized cloud environment computing that is experiencing excessive I/O latency, the identification component further configured to determine a resource along the I/O path that is a bottleneck to the excessive I/O latency;
      a virtual-to-physical resource mapping component containing virtual-to-physical resource mapping information of resources in the virtualized cloud computing environment that uses the mapping information to obtain a list of the heterogeneous migration sessions contributing to the bottleneck at the identified I/O path, wherein a migration type, a completion benefit, and a bottleneck contribution portion for each heterogeneous migration session is used to determine a priority of contribution to the bottleneck; and a throttling component that throttles a migration rate of each heterogeneous migration session in the list of heterogeneous migration sessions in an amount that corresponds to the migration type, the completion benefit that is attained by performing the migration session and the bottleneck contribution portion designating a quantity that the migration session contributes to the bottleneck at the identified I/O path.

13. The computer system according to claim 12, wherein the throttling component is configured to:

assign each migration session into a classification group according to the type of function performed, wherein heterogeneous migration sessions having common functions are assigned to similar classification groups and heterogeneous migration sessions having different functions are assigned to different classification groups; and prioritize the migration sessions in each classification group according to the type of function performed and the contribution portion associated therewith.

14. The computer system according to claim 13, wherein the throttling component is configured to:

determine an aggregate migration rate of the migration sessions in each classification group, the aggregate migration rate including a sum of transfer rates of each migration session in each classification group, the aggregate migration rate of each classification group is indicative of an amount that each group contributes to the bottleneck; and apportion a predetermined initial total target traffic reduction rate to each of the classification groups to obtain a group level rate reduction target for each group, wherein each group level rate reduction target is in proportion to the aggregate migration rate determined therefor.

15. The computer system according to according to claim 14, wherein the throttling component is configured to allocate the group level rate reduction target to each migration session in each classification group and initiate new migration sessions as a function of each of the group level rate reduction targets.

16. The computer system according to according to claim 15, wherein the throttling component is configured to increase a total target traffic reduction rate by a predetermined amount if congestion remains and rethrottle the migration rate of each heterogeneous migration session in proportion to the increased total target traffic reduction rate.

17. A computer usable memory storing computer instructions, which when executed, enables a computer system to throttle a plurality of heterogeneous migration sessions running concurrently in a virtualized cloud computing environment and sharing a same set of resources, the executed computer instructions causing the computer system to perform a method comprising:

initiating the plurality of heterogeneous migration sessions in a virtualized cloud computing environment, wherein each heterogeneous migration session is initiated by at least one cloud administrator and characterized by a type of function performed by the migration session and a value that is attained by performing the migration session;

monitoring the virtualized cloud computing environment for latency at any resource in the virtualized cloud computing environment while performing the plurality of heterogeneous migration sessions;

identifying an input/output (I/O) path to any resource in the virtualized cloud environment computing that is experiencing excessive resource congestion I/O latency;

determining a resource along the I/O path that is a bottleneck to the excessive resource congestion I/O latency;

using virtual-to-physical resource mapping information of resources in the virtualized cloud computing environment to obtain a list of the heterogeneous migration sessions contributing to the bottleneck at the identified I/O path, wherein a migration type, a completion benefit, and a bottleneck contribution portion for each heterogeneous migration session is used to determine a priority of contribution to the bottleneck; and throttling a migration rate of each heterogeneous migration session in the list of heterogeneous migration sessions in an amount that corresponds to the migration type, the completion benefit that is attained by performing the migration session and the bottleneck contribution portion designating a quantity that the migration session contributes to the bottleneck at the identified I/O path.

18. The computer usable memory according to claim 17, wherein the throttling of a migration rate of each heterogeneous migration session in the list of heterogeneous migration sessions is performed in accordance with a predetermined initial total target traffic reduction rate.

19. The computer usable memory according to claim 18, wherein the throttling of a migration rate of each heterogeneous migration session in the list of heterogeneous migration sessions includes:

assigning each migration session into a classification group according to the type of function performed, wherein heterogeneous migration sessions having common functions are assigned to similar classification groups and heterogeneous migration sessions having different functions are assigned to different classification groups; and prioritizing the migration sessions in each classification group according to the type of function performed and the contribution portion associated therewith.

20. The computer usable memory according to claim 17, wherein the method performed by the computer system operating according to the executed computer instructions further comprises:

determining an aggregate migration rate of the migration sessions in each classification group, the aggregate migration rate including a sum of transfer rates of each migration session in each classification group, the aggregate migration rate of each classification group is indicative of an amount that each group contributes to the bottleneck;

apportioning a predetermined initial total target traffic reduction rate to classification groups to obtain a group level rate reduction target for each group, wherein each group level rate reduction target is in proportion to the aggregate migration rate determined therefor;

allocating the group level rate reduction target to each migration session in each classification group;

initiating new heterogeneous migration sessions as a function of each of the group level rate reduction targets; and increasing a total target traffic reduction rate by a predetermined amount if congestion remains.

\* \* \* \* \*